United States Patent Office 2,696,441
Patented Dec. 7, 1954

2,696,441

DRY IMITATION VINEGAR AND PROCESS OF MAKING THE SAME

Thaddeus C. Kmieciak and Kenneth T. Farrell, Chicago, Ill.

No Drawing. Application October 7, 1953, Serial No. 384,799

26 Claims. (Cl. 99—147)

(Granted under Title 35, U. S. Code (1952), sec. 266)

This invention described herein, if patented, may be manufactured and used by or for the Government for governmental purposes, without the payment to us of any royalty thereon.

This application is a continuation-in-part of our copending application, Serial No. 225,658, filed May 10, 1951, now abandoned.

This invention concerns a dry rehydratable condiment, and more particularly a dry imitation vinegar.

Vinegar is an important food item, by itself as well as a constituent of many liquid condiments. Because of its high water content (about 95%), it is a relatively expensive matter to ship, and losses through container breakage are frequently incurred. Moreover, a composite ration for military and other uses cannot conveniently contain a vinegar component because of the added weight and danger of spillage.

Consequently, the present invention has as its principal object the preparation of a dry composition, which can be readily made up in tablet form, and which quickly and completely dissolves in water to yield a solution having the taste and nourishing qualities of natural vinegar.

Another object of the present invention is a dry food base, which by the addition of other flavoring agents and water can be converted into a liquid condiment such as catsup, chili sauce, Worcestershire sauce, et cetera.

A further object of the present invention is a formulation for imitation vinegar, which utilizes pure and wholesome chemicals and food essences and which by simple changes of proportions of the ingredients can be adapted to the varying tastes of vinegar consumers.

Yet a further object of the present invention is a dry vinegar tablet which can be safely carried in a pocket-size package, or even loosely.

Still further objects and advantages of our invention will readily appear from the following description of several preferred embodiments of the same.

Briefly, we have found that a dry imitation vinegar may be compounded by adsorbing glacial acetic acid and a concentrated pure fruit essence such as apple essence on a solid binder essentially comprising malic acid and a substantially dry sugar; the preferred sugar for use in our composition is dry lactose, a typical disaccharide; but other substantially dry sugars, such as sucrose (a disaccharide), or substantially dry glucose (a monosaccharide, e. g. in the form of Cerelose or corn sirup solids), or mixtures thereof, may be employed.

We prefer to use pure chemicals or reagent grade, although the presence of a small amount of non-deleterious impurities is permissible.

This composition can be easily molded into tablets of any desired size and shape by conventional tableting machines. To minimize the danger of crumbling, the tablets may be coated with a water-soluble coating substance, which is non-deleterious and does not modify the taste of the product upon dissolution.

The proportions of ingredients may be varied widely, and it will be a simple matter to the experienced condiment maker to match the taste of a sample of any given type of natural vinegar, such as malt vinegar, grain vinegar and wine vinegar. It is even possible to match the color of such samples by the simple addition of a compatible food dye to the dry mix prior to tableting.

Similarly, by the addition of dehydrated foodstuff powders, such as a dry powder obtained by the dehydration of tomato juice, dehydrated onion powder, mustard powder, dry pepper, and/or dehydrated soy powder, et cetera, to the dry imitation vinegar mix, a dry rehydratable condiment is obtained, which upon the addition of water, yields a liquid condiment having the taste of tomato catsup, chili sauce, Worcestershire sauce, mustard sauce, et cetera.

The selection and proportioning of these added ingredients is well within the skill of the experienced condiment maker.

By way of example, and not by way of limitation, there are given six specific examples of dry imitation vinegar preparations in accordance with the present invention.

*Example 1*

300 grams of dl (inactive) malic acid, 300 grams of lactose, reagent grade, 2.5 grams of citric acid hydrate, and .05 grams of caramel (burnt sugar shade 85%) are blended together to a homogeneous fine powder. 90 ml. of glacial acetic acid reagent grade are added, and the mix is ground until the acetic acid has been adsorbed. 15 ml. of apple essence are then added, and the grinding of the mix is continued until the apple essence (350-fold) has been likewise adsorbed and a homogeneous mixture formed.

110 grams of this mixture, diluted with water to one quart, yield an imitation table vinegar of the cider vinegar type.

*Example 2*

150 grams of dl (inactive) malic acid, 450 grams of lactose, reagent grade, .05 grams of caramel (burnt sugar shade 85%) are ground together to a homogeneous fine powder. 120 ml. of glacial acetic acid reagent grade are added, and the mix is ground until the acetic acid has been adsorbed. 15 ml. of apple essence are then added, and the grinding of the mix is continued until the apple essence (350-fold) has been likewise adsorbed and a homogenous mixture formed.

113 grams of this mixture diluted with water to one quart will yield an imitation table vinegar having a pleasant tart taste.

*Example 3*

300 grams of dl (inactive) malic acid, 300 grams of glucose ("Cerelose") anhydrous, 2.5 grams of citric acid hydrate, and 0.05 gram of caramel (burnt sugar shade 85 percent) are blended together to a homogeneous fine powder. 90 ml. of glacial acetic acid reagent grade are added, and the mix is ground until the acetic acid has been adsorbed. 15 ml. of apple essence are then added, and the grinding of the mix is continued until the apple essence (350 fold) has been likewise adsorbed and a homogeneous mixture formed.

110 grams of this mixture, diluted with water to one quart, yields an imitation table vinegar of the cider vinegar type.

*Example 4*

300 grams of dl (inactive) malic acid, 300 grams of sucrose, 2.5 grams of citric acid hydrate, and 0.05 grams of caramel (burnt sugar shade 85 percent) are blended together to a homogeneous fine powder. 90 ml. of glacial acetic acid reagent grade are added, and the mix is ground until the acetic acid has been absorbed. 15 ml. of apple essence are then added, and the grinding of the mix is continued until the apple essence (350 fold) has been likewise adsorbed and a homogeneous mixture formed.

110 grams of this mixture, diluted with water to one quart, yields an imitation table vinegar of the cider vinegar type.

*Example 5*

300 grams of dl (inactive) malic acid, 150 grams sucrose, 150 grams glucose ("Cerelose") 2.5 grams of citric acid hydrate, and 0.05 grams of caramel (burnt sugar shade 85 percent) are blended together to a homogeneous fine powder. 90 ml. of glacial acetic acid reagent are added, and the mix is ground until the acetic acid has been adsorbed. 15 ml. of apple essence are then added, and the grinding of the mix is continued until the apple essence (350 fold) has been likewise adsorbed, and a homogeneous mixture formed.

110 grams of this mixture, diluted with water to one quart, yields an imitation table vinegar of the cider vinegar type.

Example 6

300 grams of dl (inactive) malic acid, 300 grams of corn sirup solids, 2.5 grams of citric acid hydrate, and 0.05 gram of caramel (burnt sugar shade 85 percent) are blended together to a homogeneous fine powder. 90 ml. of glacial acetic acid reagent grade are added, and the mix is ground until the acetic acid has been adsorbed. 15 ml. of apple essence are then added, and the grinding of the mix is continued until the apple essence (350 fold) has been likewise adsorbed and a homogeneous mixture formed.

110 grams of this mixture, diluted with water to one quart, yields an imitation table vinegar of the cider vinegar type.

The apple essence employed in the foregoing examples may be prepared by vapor distillation and condensation of apple juice in accordance with Patents 2,457,315, Milleville, and/or 2,479,745, Homiller et al., both assigned to the United States of America as represented by the Secretary of Agriculture, or by other suitable processes. The degree of concentration (350 fold) refers to the concentration of flavor in comparison with fresh apple juice; it will be understood that other concentrations may be employed with a suitable volume adjustment. Other concentrated fruit essences, e. g. grape essence, may be substituted for part or all of the apple essence, in the preparation of special type dry imitation vinegars, e. g. of the wine vinegar type. Synthetic fruit essence may also be used.

As heretofore pointed out, the foregoing specific formulations may be changed to suit various tastes. For instance, a 1:2 or 1:4 ratio by weight of dl malic acid and lactose may be employed instead of the 1:1 and 1:3 ratios shown in Examples 1 and 2, respectively; the ratios of dl malic acid to sugar in Examples 3 to 6 may be similarly varied. Glacial acetic acid, reagent grade, is 99.5% acetic acid, the balance being water; the presence of a small amount of additional water is not fatal, but the presence of water progressively interferes with intimate blending and is therefore undesirable. Basically, our formulations are an adsorption of acetic acid and pure fruit essence on an edible and taste-compatible binder substance, which is readily soluble in water.

The reconstituted (rehydrated) imitation vinegar prepared in accordance with our invention compares with a typical ordinary table vinegar as follows:

|  | pH | Titrable Acidity (Acetic) |
| --- | --- | --- |
| Table vinegar | 2.48 | 5.29 |
| Example 1 | 1.85 | 5.53 |
| Example 2 | 2.00 | 3.74 |

Dry imitation vinegar, prepared in accordance with the present invention, may be packaged in tubes of non-corrosive metal, glass or plastic material, or other suitable containers, including even paper rolls of the conventional candy wrapper type. By substituting 1 (levorotatory optically active) malic acid for dl (optically inactive) malic acid, a paste instead of a powder is obtained; for most purposes this is less desirable than the product obtained with dl malic acid which, moreover, is less costly than 1 malic acid.

It will readily appear from the foregoing description of our invention and of several specific examples of putting the same into practice that we have provided a dry condiment readily reconstitutable by the addition of water to yield an imitation vinegar or a liquid condiment having a vinegar base. Modifications and adaptations of our basic formulations, to suit different tastes and to imitate and even vary certain well-known types of natural vinegars may be made without departing from the spirit of our invention. We thus desire to claim the invention broadly and to limit its scope only by the appended claims.

We claim:

1. A dry rehydratable condiment composition comprising glacial acetic acid, malic acid, lactose, and fruit essence, said condiment being characterized by a vinegar flavor upon rehydration.

2. A dry rehydratable condiment composition comprising glacial acetic acid, malic acid, lactose, and apple essence, said condiment being characterized by a vinegar flavor upon rehydration.

3. A dry rehydratable condiment composition comprising glacial acetic acid, malic acid, a sugar, and fruit essence, said condiment being characterized by vinegar flavor upon rehydration.

4. A dry rehydratable condiment composition comprising glacial acetic acid, malic acid, a sugar, and apple essence, said condiment being characterized by a vinegar flavor upon rehydration.

5. A dry imitation vinegar comprising glacial acetic acid and apple essence adsorbed upon an edible water-soluble binder, said binder comprising malic acid and sugar.

6. A dry imitation vinegar comprising glacial acetic acid and apple essence adsorbed upon an edible water-soluble binder, said binder comprising malic acid and lactose.

7. A dry imitation vinegar comprising glacial acetic acid and apple essence adsorbed upon an edible water-soluble binder, said binder comprising dl malic acid and lactose.

8. A dry imitation vinegar comprising glacial acetic acid and apple essence adsorbed upon an edible water-soluble binder, said binder comprising malic acid and glucose.

9. A dry imitation vinegar comprising glacial acetic acid and apple essence adsorbed upon an edible water-soluble binder, said binder comprising malic acid and Cerelose.

10. A dry imitation vinegar comprising glacial acetic acid and apple essence adsorbed upon an edible water-soluble binder, said binder comprising malic acid and corn sirup solids.

11. A dry imitation vinegar comprising glacial acetic acid and apple essence adsorbed upon an edible water-soluble binder, said binder comprising malic acid and sucrose.

12. A dry imitation vinegar comprising glacial acetic acid and apple essence adsorbed upon an edible water-soluble binder, said binder comprising malic acid and a mixture of sucrose and glucose.

13. A dry imitation vinegar comprising glacial acetic acid and apple essence adsorbed upon an edible water-soluble binder, said binder comprising dl malic acid and sugar, the proportion of said ingredients being approximately 90–120 ml. of glacial acetic acid, 15 ml. of 350-fold apple essence, 150–300 grams of dl malic acid, and 300–450 grams of sugar.

14. A dry imitation vinegar comprising glacial acetic acid and apple essence adsorbed upon an edible water-soluble binder, said binder comprising dl malic acid and lactose, reagent grade, the proportion of said ingredients being approximately 90–120 ml. of glacial acetic acid, 15 ml. of 350-fold apple essence, 150–300 grams of dl malic acid, and 300–450 grams of lactose.

15. A dry imitation vinegar composition comprising approximately:

300 grams dl malic acid
300 grams lactose, reagent grade
2.5 grams citric acid (hydrated)
.05 gram caramel
90 ml. glacial acetic acid
15 ml. apple essence, 350-fold.

16. A dry imitation vinegar composition comprising approximately:

150 grams dl malic acid
450 grams lactose, reagent grade
.05 gram caramel
120 ml. glacial acetic acid
15 ml. apple essence, 350-fold.

17. A liquid vinegar-flavored condiment comprising a water solution of a composition according to claim 1.

18. A liquid imitation vinegar comprising a water solution of a composition according to claim 4.

19. A liquid imitation vinegar comprising a water solution of a composition according to claim 15.

20. A liquid imitation vinegar comprising a water solution of a composition according to claim 16.

21. A process of making dry imitation vinegar comprising adding glacial acetic acid and fruit essence to a mixture of malic acid and a sugar, and blending said ingredients together until a uniform mixture is obtained.

22. A process of making dry imitation vinegar comprising adding glacial acetic acid and apple essence to a mixture of malic acid and a sugar, and blending said ingredients together until a uniform mixture is obtained.

23. A process of making dry imitation vinegar comprising blending and mixing dl malic acid and lactose to a uniform mixture, adding thereto glacial acetic acid and apple essence, and stirring said ingredients together until said glacial acetic acid and apple essence are adsorbed and a dry uniform mass is obtained.

24. A process according to claim 23 wherein dl malic acid and lactose are present in a proportion of one part by weight of dl malic acid to form about one to about four parts by weight of lactose.

25. A process according to claim 21, including the step of tableting said dry uniform mass.

26. The process according to claim 21, including the step of adding a dehydrated foodstuff powder to said mixture.

References Cited in the file of this patent

UNITED STATES PATENTS

| Number | Name | Date |
| --- | --- | --- |
| 1,520,366 | Oser | Dec. 23, 1924 |

FOREIGN PATENTS

| Number | Country | Date |
| --- | --- | --- |
| 27,191 | Great Britain | 1898 |

OTHER REFERENCES

"Inactive Malic Acid as a Food Acidulent," Industrial Eng. Chem., vol. 15, pages 628–630 (1923).